US008867127B2

(12) United States Patent
Seifert

(10) Patent No.: US 8,867,127 B2
(45) Date of Patent: Oct. 21, 2014

(54) DEVICE AND METHOD FOR THE ADJUSTED MOUNTING OF A MICROSCOPE STAGE TO A MICROSCOPE STAND

(75) Inventor: Roland Seifert, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 210 days.

(21) Appl. No.: 13/313,377

(22) Filed: Dec. 7, 2011

(65) Prior Publication Data
US 2012/0147459 A1 Jun. 14, 2012

(30) Foreign Application Priority Data

Dec. 10, 2010 (DE) .......................... 10 2010 061 166

(51) Int. Cl.
*G02B 21/26* (2006.01)
*G02B 21/24* (2006.01)
(52) U.S. Cl.
CPC ...................................... *G02B 21/24* (2013.01)
USPC ........................................................ 359/393
(58) Field of Classification Search
None
See application file for complete search history.

(56) References Cited

U.S. PATENT DOCUMENTS

| | | | | | |
|---|---|---|---|---|---|
| 3,572,888 | A | * | 3/1971 | Kawashima | .................. 359/393 |
| 3,572,889 | A | | 3/1971 | Bloomfield | |
| 4,012,112 | A | * | 3/1977 | Masterson | ..................... 359/393 |
| 5,802,925 | A | * | 9/1998 | Kanao | ........................ 74/490.13 |
| 6,018,415 | A | * | 1/2000 | Woo et al. | ...................... 359/393 |
| 2002/0044348 | A1 | | 4/2002 | Utsugi | |
| 2002/0080479 | A1 | * | 6/2002 | Nishida et al. | ................. 359/393 |
| 2003/0210460 | A1 | * | 11/2003 | Takahama | ...................... 359/391 |
| 2004/0108641 | A1 | * | 6/2004 | Reese et al. | ....................... 269/56 |
| 2005/0083569 | A1 | | 4/2005 | Pomerantz et al. | |
| 2005/0111093 | A1 | * | 5/2005 | Bonaventura et al. | ......... 359/391 |
| 2008/0013812 | A1 | * | 1/2008 | Maenle et al. | ................. 382/128 |
| 2008/0198450 | A1 | * | 8/2008 | Guo et al. | ...................... 359/392 |
| 2009/0134342 | A1 | | 5/2009 | Hell et al. | |

(Continued)

FOREIGN PATENT DOCUMENTS

DE   10 2006 021 317 B3   10/2007
DE   10 2008 024 568 A1   12/2009

(Continued)

OTHER PUBLICATIONS

Rust, M. J. et al., "Sub-diffraction-limit imaging by stochastic optical reconstruction microscopy (STORM)", Nature Methods, Oct. 2006, vol. 3, No. 10, pp. 793-795.

(Continued)

*Primary Examiner* — Derek S Chapel
(74) *Attorney, Agent, or Firm* — Hodgson Russ LLP

(57) ABSTRACT

A device and method for adjusting mounting of a microscope stage (14), to which an objective (38) is mounted, to a microscope stand (12), including at least one first connecting element (56) arranged on the microscope stand (12), at least one second connecting element (62) arranged on the microscope stage (14) for mounting the microscope stage (14) to the microscope stand (12), at least one first mating part (76) arranged on the microscope stand (12), at least one positioning base (66) supporting a second mating part (74), wherein the positioning base (66) adjusts the platform (16) on the microscope stand (12) and is mounted movably in a plane of adjustment that is parallel to the platform (16) with the mating parts (74, 76) being engaged, and at least one locking device (80) for locking the positioning base (66) to the platform (16).

9 Claims, 7 Drawing Sheets

(56) References Cited

U.S. PATENT DOCUMENTS

2009/0295963 A1* 12/2009 Bamford et al. .............. 348/302
2010/0007946 A1* 1/2010 Takeuchi ...................... 359/385
2011/0089771 A1* 4/2011 Brooker et al. ............ 310/12.05

FOREIGN PATENT DOCUMENTS

| JP | 2001066515 | 3/2001 |
|---|---|---|
| WO | 2006/127692 A2 | 11/2006 |
| WO | 2007/128434 A1 | 11/2007 |

OTHER PUBLICATIONS

Geisler, C. et al., "Resolution of $\lambda/10$ in fluorescence microscopy using fast single molecule photo-switching", Applied Physics A, Jun. 1, 2007, vol. 88, pp. 223-226.

* cited by examiner

DEVICE AND METHOD FOR THE ADJUSTED MOUNTING OF A MICROSCOPE STAGE TO A MICROSCOPE STAND

CROSS REFERENCE TO RELATED APPLICATIONS

This application claims priority of German patent application number 10 2010 061 166.2 filed Dec. 10, 2010, the entire disclosure of which is incorporated by reference herein.

FIELD OF THE INVENTION

The present invention relates generally to a device and a method for the adjusted mounting of a microscope stage to a microscope stand.

BACKGROUND OF THE INVENTION

In the recent past, light microscopic methods have been developed with which, based on a sequential, stochastic localization of individual point objects, in particular fluorescence molecules, image structures can be imaged that are smaller than the diffraction-dependent resolution limit of conventional light microscopes. Such methods are, for example, described in WO 2006/127692 A2; DE 10 2006 021 317 B3; WO 2007/128434 A1, US 2009/0134342 A1; DE 10 2008 024 568 A1; "Sub-diffraction-limit imaging by stochastic optical reconstruction microscopy (STORM)", Nature Methods 3, 793-796 (2006), M. J. Rust, M. Bates, X. Zhuang; "Resolution of Lambda/10 in fluorescence microscopy using fast single molecule photo-switching", Geisler C. et al, Appl. Phys. A, 88, 223-226 (2007). This new branch of microscopy is also referred to as localization microscopy. The applied methods are known in the literature, for example, under the designations (F) PALM ((Fluorescence) Photoactivation Localization Microscopy), PALMIRA (PALM with Independently Running Acquisition), GSD (IM) (Ground State Depletion (Individual Molecule return) Microscopy) or (F) STORM ((Fluorescence) Stochastic Optical Reconstruction Microscopy).

The new methods have in common that the structures to be imaged are prepared with markers that have two distinguishable states, namely a "bright" state and a "dark" state. When, for example, fluorescent dyes are used as markers, then the bright state is a state in which they are able to fluoresce and the dark state is a state in which they are not able to fluoresce. For imaging image structures with a resolution that is higher than the conventional resolution limit of the imaging optical system, a small subset of the markers is repeatedly brought into the bright state and thus it is so to speak activated. In this connection, the activated subset is to be chosen such that the average distance of adjacent markers in the bright state is greater than the resolution limit of the imaging optical system. The luminance signals of the activated subset are imaged onto a spatially resolving light detector, e.g. a CCD camera. Thus, of each marker a light spot is detected whose size is determined by the resolution limit of the imaging optical system.

In this way, a plurality of raw data single frames is captured, in each of which a different activated subset is imaged. Using an image analysis process, then in each raw data single frame the centroids of the light spots are determined which represent those markers that are in the bright state. Thereafter, the centroids of the light spots determined from the raw data single frames are combined to a total representation. The high-resolution image created from this total representation reflects the distribution of the markers. For a representative reproduction of the structure to be imaged sufficient signals have to be detected. Since however the number of markers in the respective activated subset is limited by the minimum average distance which two markers may have in the bright state, a great many raw data single frames have to be captured to completely image the structure. Typically, the number of raw data single frames is in a range between 10,000 and 100,000.

The time required for capturing one raw data single frame has a lower limit that is predetermined by the maximum image capturing rate of the imaging detector. This results in relatively long total capturing times for a series of raw data single frames required for the total representation. Thus, the total capturing time can take up to several hours.

Over this long total capturing time, a movement of the specimen to be imaged relative to the imaging optical system may occur. Since for creating a high-resolution total image all raw data single frames are combined after the determination of the centroids, each relative movement between specimen and imaging optical system that occurs during the capturing of two successive raw data singles frames impairs the spatial resolution of the total image. In many cases, this relative movement results from a systematic mechanical movement of the system, also referred to as mechanical drift, which movement is caused, for example, by thermal expansion or shrinkage, by mechanical strains or by the change in the consistency of lubricants used in the mechanical components.

In the above-described high-resolution methods, it is of particular importance to ensure a drift-free positioning of the objective forming the imaging system relative to the specimen arranged on the platform. This can be achieved in that the objective is not, as usual, mounted to an objective revolver but directly to the platform. With such a design, the objective is arranged on the underside of the platform facing away from the specimen in the area of a through hole formed in the platform and images the specimen which is arranged on a specimen holder resting on the upper side of the platform through the through hole. As a result of the direct mounting of the objective to the platform, the path over which the objective is mechanically coupled to the specimen holder is relatively short, whereby a mechanical drift occurring between the objective and the specimen holder can largely be prevented.

When the objective is directly mounted to the microscope stage, then, however, the alignment of the objective to the optical axis of the microscope stand is relatively complex. For instance, the microscope stage has to be re-adjusted relative to the microscope stand whenever it has been removed from the microscope stand for example for repair purposes. This is laborious and error-prone.

From U.S. Pat. No. 3,572,889 A, a mechanism is known which serves to quickly mount different microscope stages to a microscope stand in an adjusted manner. This mechanism comprises an adjusting unit formed of a mounting bracket and a mounting plate arranged at the rear side of the mounting bracket. The mounting plate is fixed to a sliding element which is arranged vertically movably on the microscope stand. The microscope stage is coupled to the mounting bracket. The mounting plate and the mounting bracket have contact surfaces which allow a displacement of the mounting plate relative to the mounting bracket.

In US 2005/0083569 A1, a microscope is described having a focusing column, a stage and a mechanism which enables the removal of the focusing column from the stage. This mechanism comprises a threaded shaft mounted to the focusing column and a knurled wheel which is provided with a matching thread and can be rotated within the stage to couple and decouple the focusing column to and from the stage.

SUMMARY OF THE INVENTION

The invention is based on the object to specify a device and a method for the high-resolution light microscopy which enable an adjusted mounting of a microscope stage, to which an objective is mounted, to a microscope stand in an easy and reproducible manner.

The invention solves this object by a device described herein having at least one first connecting element arranged on the microscope stand, at least one second connecting element which is arranged on the microscope stage and is connectable to the first connecting element for mounting the microscope stage to the microscope stand, at least one first mating part arranged on the microscope stand, at least one positioning base which is arranged on the underside of a platform of the microscope stage facing the microscope stand and supports a second mating part which is engageable with the first mating part, wherein the positioning base for adjusting the platform on the microscope stand is mounted movably in a plane of adjustment that is parallel to the platform with the mating parts being engaged, and at least one locking device for locking the positioning base to the adjusted platform.

Thus, the invention provides to displace the platform in the plane of adjustment on the microscope stand, while a positioning base arranged on the underside of the platform is in an accurately fitting connection relative to the microscope stand via the engaging mating parts. For this, the positioning base is mounted movably in the plane of adjustment. This type of mounting can also be referred to as "floating".

When the desired positioning of the platform on the microscope stand has been attained, in which the objective mounted to the platform is precisely aligned to the optical axis of the microscope stand, the positioning base and thus the mating part held thereon is fixed to the platform by means of the locking device. Thus, the adjusted positioning of the platform on the microscope stand is defined in a reproducible manner. When the microscope stage is removed from the microscope stand for example for repair purposes, then it is subsequently simply re-placed on the microscope stand such that the mating parts engage with one another. A repeated adjustment is not necessary.

In an advantageous development, a base receptacle is formed on the underside of the platform, in which the positioning base is arranged with clearance in the plane of adjustment. On the upper side of the platform facing away from the microscope stand, at least one insertion hole is formed which leads into the base receptacle. In the positioning base at least one recess is formed which is in communication with the insertion hole over the entire area in which the positioning base is movable in the plane of adjustment as a result of its clearance. The locking device comprises a clamp having a first clamping element seated in the base receptacle and a second clamping element which is seated in the insertion hole and can be tightened on the first clamping element to lock the positioning base arranged in the base receptacle between the two clamping elements.

The part of the clamp arranged in the insertion hole or in the recess of the positioning base has a clearance in the plane of adjustment. In this embodiment, the positioning base is mounted in a floating manner in the recess formed in the platform. As a result thereof, the platform can be displaced on the microscope stand, while the positioning base is firmly seated on the microscope stand. As soon as the platform is adjusted, the positioning base can be locked in the recess by means of the clamp. For this, it is clamped between the two clamping elements. As the first clamping element is seated in the insertion hole formed on the upper side of the platform, it can be accessed from above. As a result thereof, the positioning base can easily be locked from above after the desired adjustment has been achieved.

In a preferred development, at least one positioning bar is mounted to the microscope stand, at which positioning bar the first connecting element and the first mating part are arranged. The positioning bar can, for example, be mounted via standard mounting holes which are present on the microscope stand anyway for mounting the microscope stage. The positioning bar thus defines an interface for the mating parts to be engaged. It goes without saying that the inventive adjusting device does not necessarily require such an interface. In this case, the first mating part is to be provided directly on the microscope stand.

According to a further aspect of the invention, a method for the adjusted mounting of a microscope stage to a microscope stand is described herein.

BRIEF DESCRIPTION OF THE DRAWINGS

Exemplary embodiments of the present invention are described in more detail below with reference to the schematic drawings, in which.

DETAILED DESCRIPTION OF THE INVENTION

Figure 1:
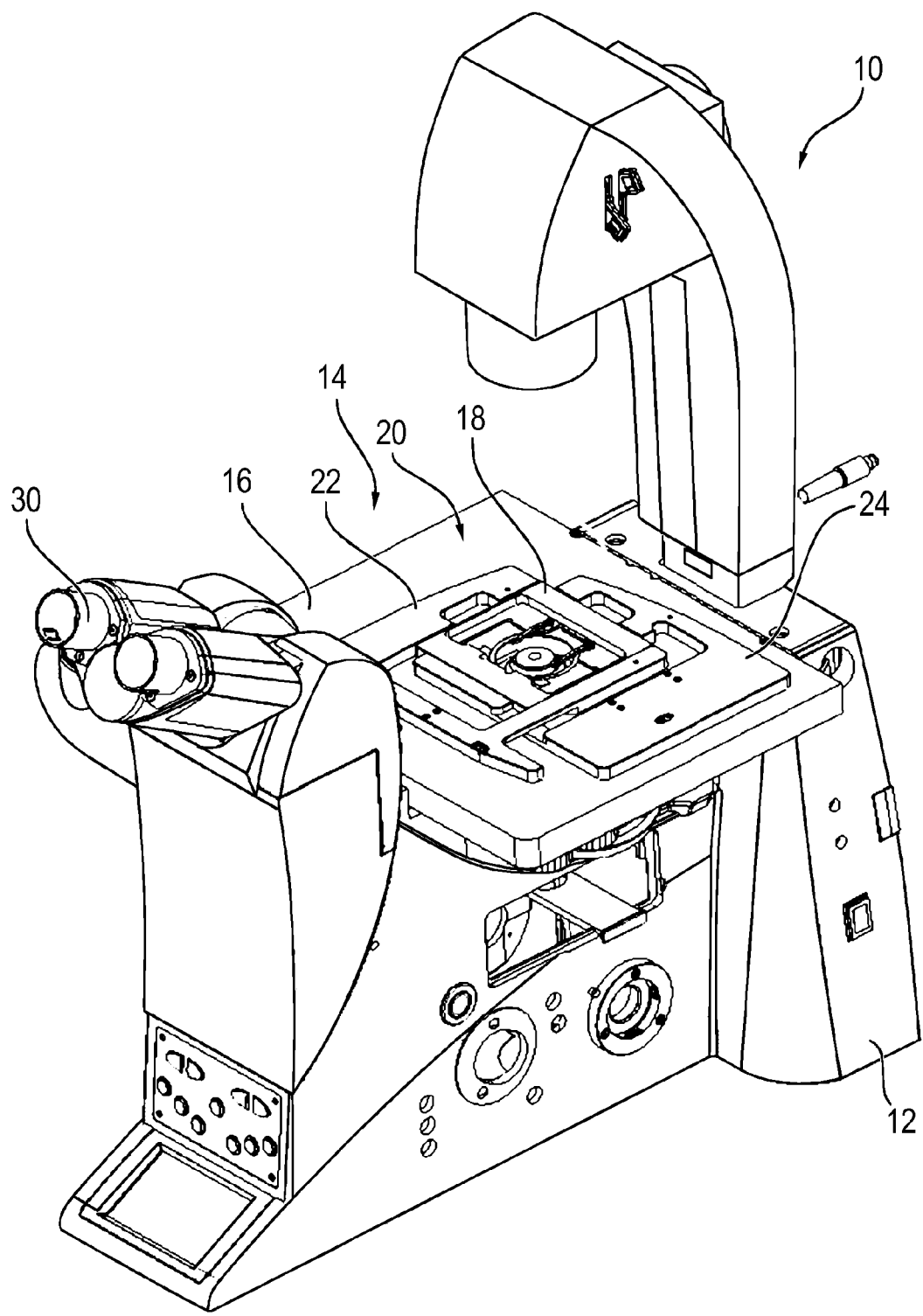
FIG. 1 shows a perspective view of a high-resolution light microscope as an embodiment.
Figure 2:
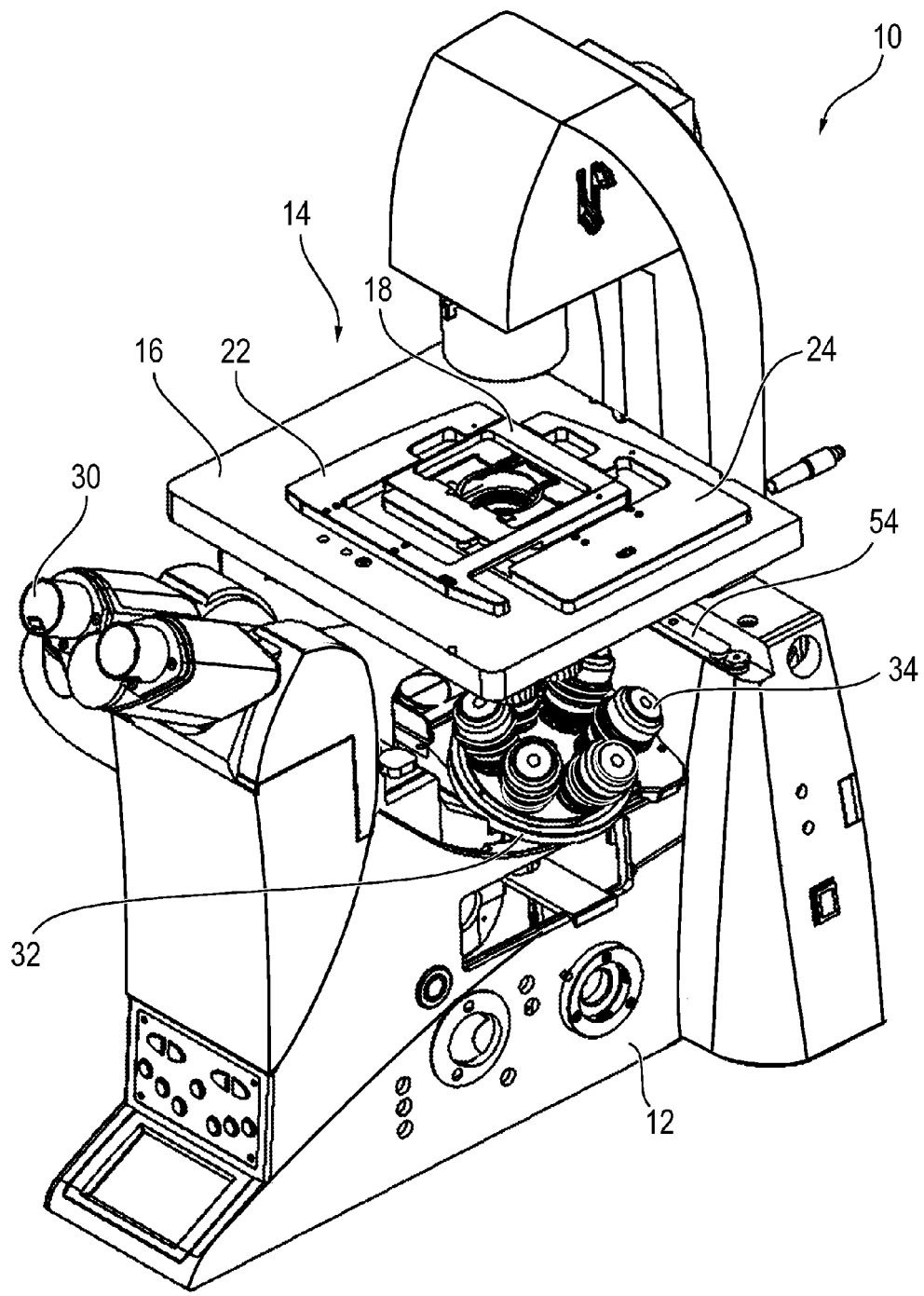
FIG. 2 shows a perspective view of the light microscope with lifted microscope stage.
Figure 3:
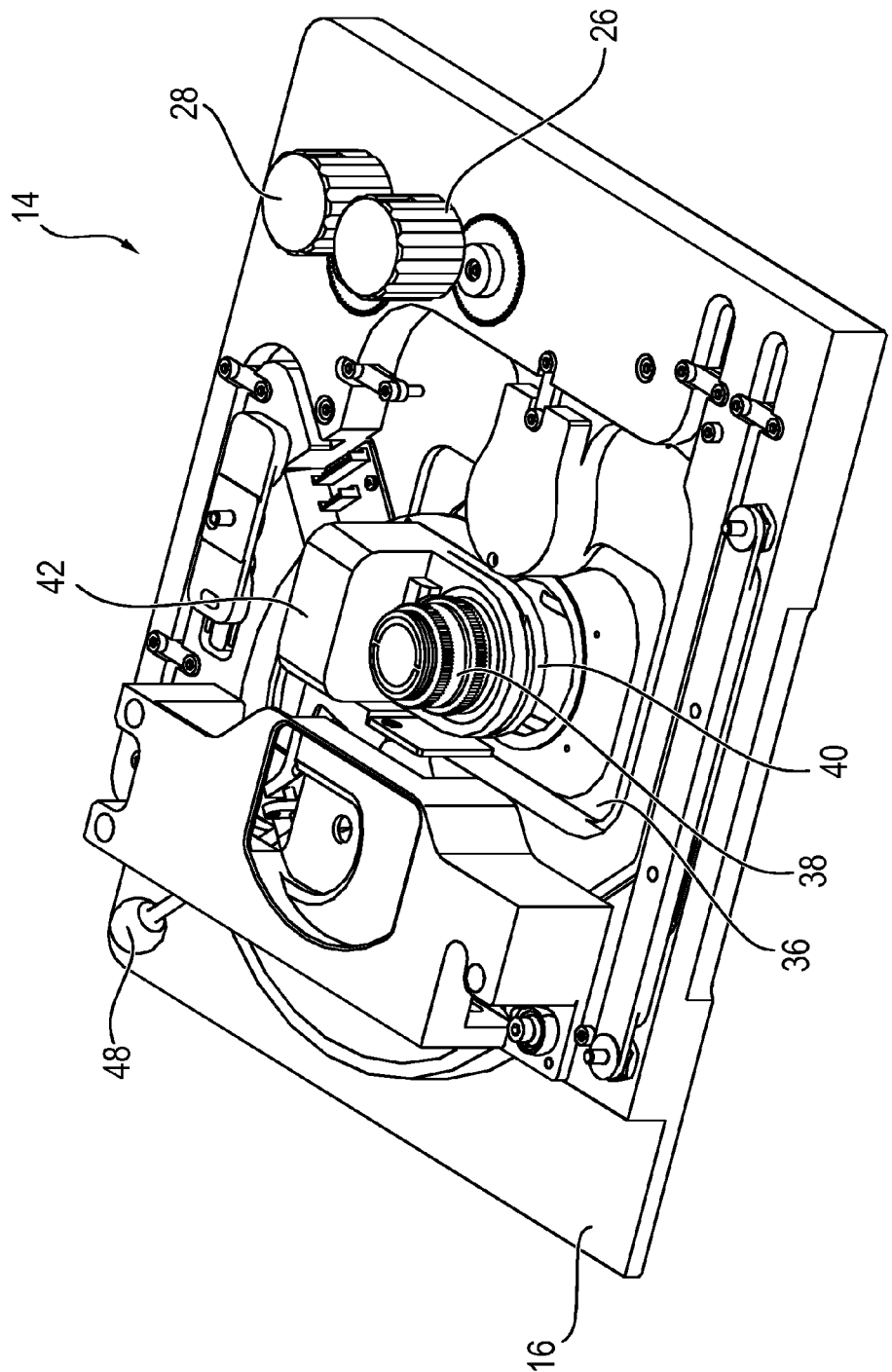
FIG. 3 shows a perspective bottom view of the microscope stage.

In the following, at first the total structure of a high-resolution light microscope 10 is explained with reference to FIGS. 1 to 3. Here, only those components of the light microscope 10 are described which are essential for understanding the present invention.

The light microscope 10 has a microscope stand 12 on which a microscope stage 14 is screwed. The microscope stage 14 has a platform 16 on which a specimen holder 18 rests. On the platform 16, there is a positioning device which is generally identified with the reference sign 20 and which is composed of a first slider 22 and a second slider 24. The two sliders 22 and 24 are mechanically decoupled from each other and serve to displace the specimen holder 18 on the platform 16 in two orthogonal directions. For this, two handwheels 26 and 28 are mounted to the underside of the platform 16, as shown in FIG. 3.

The light microscope 10 further has a pair of eyepieces 30 mounted to the microscope stand 12 as well as an objective revolver 32 holding several microscope objectives 34. In the illustration of FIG. 2, which shows the light microscope 10 with the microscope stage 14 lifted from the microscope stand 12, the objective revolver 32 which is otherwise covered by the microscope stage 14 is visible.

As shown in the bottom view of FIG. 3, an objective 38 is arranged on the underside of the platform 16 below a through hole 36 formed in the platform 16. The objective 38 is screwed into a focusing drive 40 via an objective thread. The focusing drive 40 is, for example, a piezo-ceramic actuator which moves the objective 38 along its optical axis for focusing on the specimen to be imaged. The focusing drive 40 is mounted to a holder 42 which is pivotable below the platform 16. By means of a pivoted lever 48, the holder 42 together with the objective 38 can be swiveled into and out of the imaging beam path of the light microscope 10.

As a result of the direct mounting of the objective 38 to the platform 16, the path over which the objective 38 is mechanically coupled to the specimen holder 18 is relatively short. The occurrence of a mechanical drift between the objective 38 and the specimen holder 18 can thus largely be prevented.

To guarantee a high-resolution imaging of the specimen by the objective 38, it has to be ensured that the microscope stage 14 supporting the objective 38 is accurately positioned on the microscope stand 12. In particular, the objective 38 has to be precisely aligned to the optical axis of the microscope stand 12.

The adjusting device described in the following makes it possible to mount the microscope stage 14 to the microscope stand 12 in a precisely adjusted manner. In particular, by means of the adjusting device it is made possible to re-mount the microscope stage 14 to the microscope stand 12 without having to re-adjust this stage after it had been removed from the microscope stand 12 for example for repair purposes (see FIG. 2).

Figure 4:
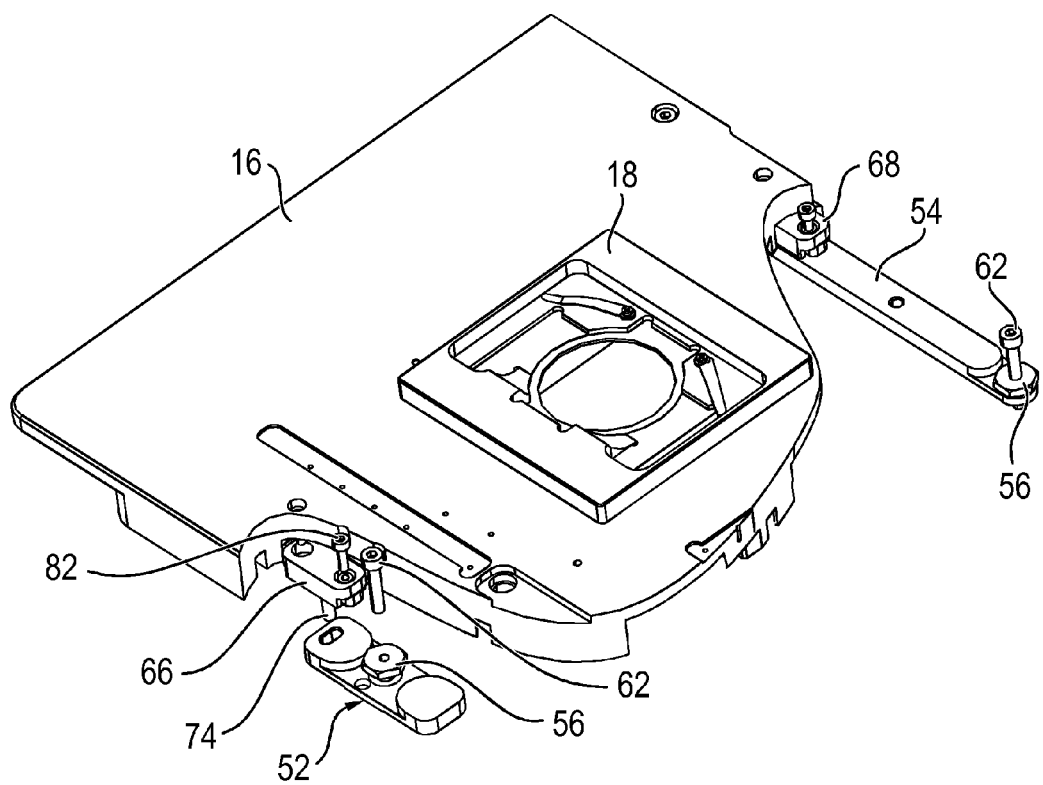
FIG. 4 shows a view of the microscope stage, in which for illustrating the components forming the inventive adjusting device a part of the microscope stage is omitted.
Figure 5:
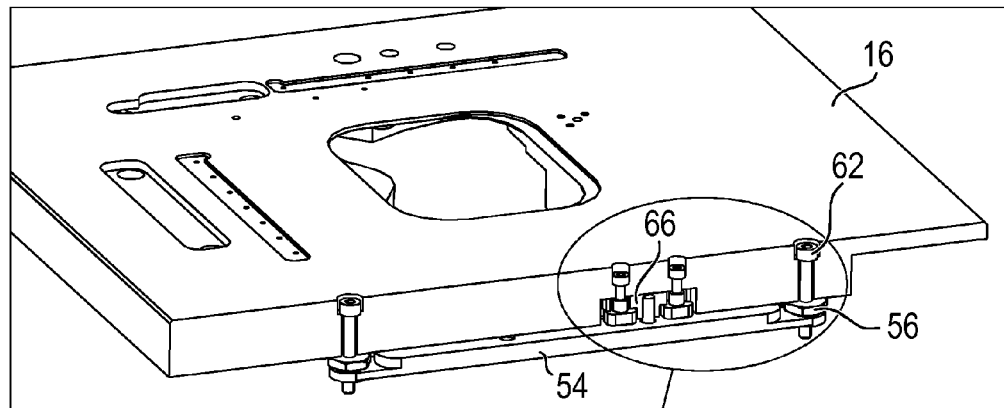
FIG. 5 shows a further view of the microscope stage, in which the adjusting device is partially sectionally illustrated.

As shown in the view of FIG. 4, in which parts of the platform 16 are omitted, the adjusting device comprises two positioning bars 52 and 54 which are mounted to the microscope stand 12. In the view of FIG. 2, the positioning bar 54 mounted to the microscope stand 12 is partially visible. The positioning bars 52 and 54 are fixed at standard screw holes which are already present on the microscope stand 12 anyway to mount the microscope stage 14 (without the inventive adjusting device) to the microscope stand 12.

The positioning bars 52 and 54 are each mounted to the microscope stand 12 via two screw/nut elements 56 which are screwed into the afore-mentioned standard screw holes. As can be seen in the enlarged view of FIG. 6, the screw/nut elements 56 each have a threaded shaft 58 which is screwed into the associated standard screw hole of the microscope stand 12, and a nut 60. The nut 60 has an internal thread into which a fixing screw 62 can be screwed to mount the platform 16 of the microscope stage 14 on the respective positioning bar 52 and 54, respectively. For this, through holes 64 into which the fixing screws 62 can be inserted are formed in the platform 16.

Figure 8:
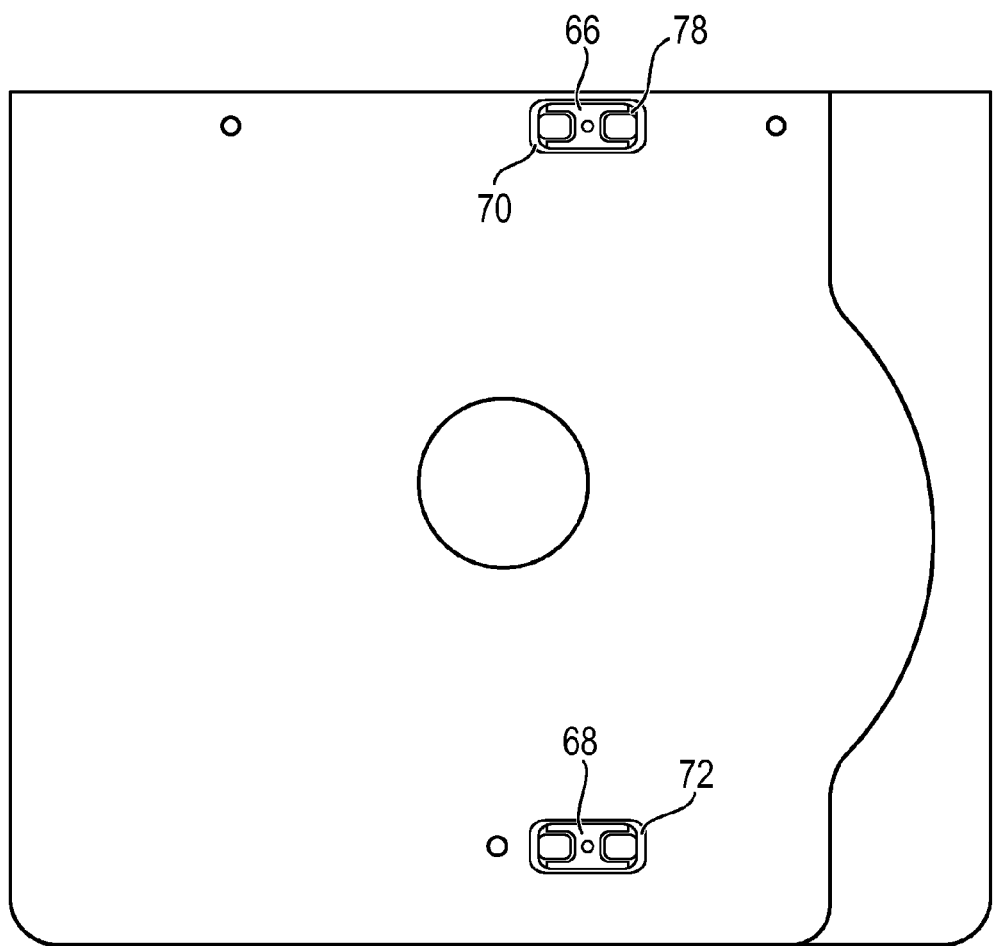
FIG. 8 shows a view of the microscope stage, in which the positioning bases and the locking clamps are shown from below.

The inventive adjusting device further has two positioning bases 66 and 68 which are allocated to the two positioning bars 52 and 54, respectively. As can be seen in the bottom view of FIG. 8, the positioning bases 66 and 68 are arranged in base receptacles 70 and 72, respectively, which are formed in the underside of the platform 16. As the two positioning bases 66 and 68 have the same structure and function, only the positioning base 66 and the components interacting therewith are described in detail in the following.

Figure 6:
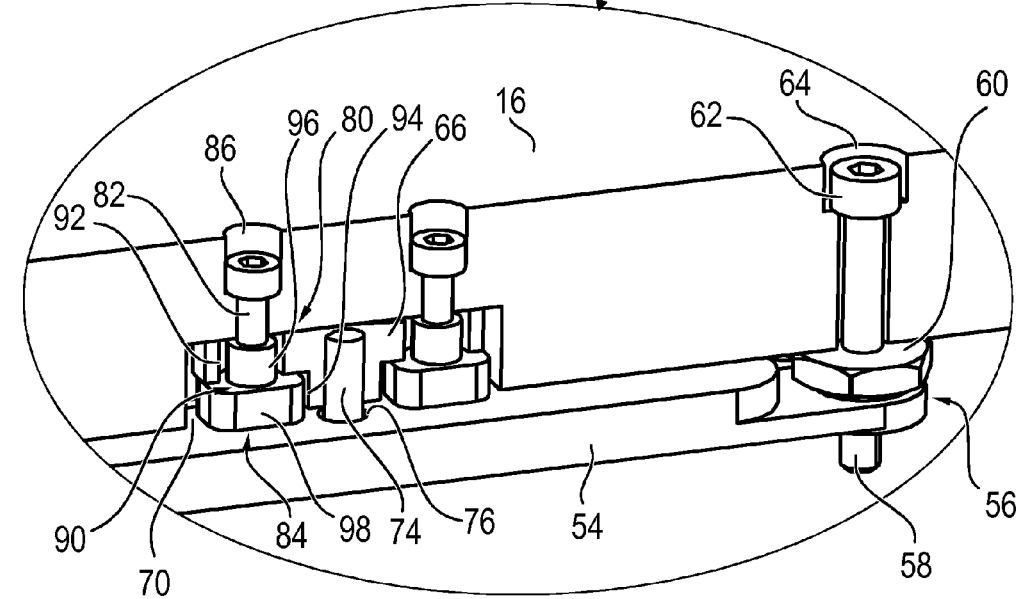
FIG. 6 shows a view in which a part of FIG. 5 is illustrated to a larger scale.

As can be taken from the enlarged view of FIG. 6, the positioning base 66 supports a mating pin 74 which can be engaged with a mating hole 76 formed in the positioning bar 54. The mating pin 74 and the mating hole 76 engage with each other in an accurately fitting manner, i.e. largely free of any clearance.

The positioning base 66 is mounted in the base receptacle 70 in a floating manner. This means that the positioning base 66 (in the unlocked state) is movable within the base receptacle 70 in a plane of adjustment that is parallel to the platform 16. When the mating pin 74 and the mating hole 76 are engaged, thus the platform 16 can be moved in the plane of adjustment relative to the positioning base 66 and thus to the microscope stand 12. This freedom of movement of the platform 16 is used to align the microscope stage 14 together with the objective 38 held thereon precisely to the optical axis of the microscope stand 12.

As soon as the microscope stage 14 is adjusted to the microscope stand 12, then the previously movable positioning base 66 can be locked in the base receptacle 70 by means of two locking clamps 80 having the same structure to thus secure the platform 16 relative to the positioning bar 54. As shown in FIG. 6, the two locking clamps 80 have the same structure. Therefore, merely the left-hand side locking clamp 80 of FIG. 6 is described in detail in the following.

The locking clamp 80 comprises a clamping screw 82 and a clamping nut 84 screwed thereto. The clamping screw 82 is seated in an insertion hole 86 which is formed in the platform 16 and leads from above into the base receptacle 70. The clamping nut 84 is arranged in the base receptacle 70.

On both sides of the mating pin 74, the positioning base 66 has two recesses 90. In the cross-sectional view of FIG. 6, the recesses 90 are each formed in a stepped manner. Each recess 90 is composed of a connecting portion 92, which is connected with the associated insertion hole 86, and a contact portion 94 facing the positioning bar 54. In these two portions 92 and 94 of the recess 90, the clamping nut 84 is arranged. Thus, the clamping nut 84 has a cylindrical coupling part 96 which is arranged in the connecting portion 92 of the recess 90 as well as a contact part 98 which substantially has the form of a rectangular cuboid and is seated in the contact portion 94 of the recess 90. The contact part 98 of the clamping nut 84 is expanded relative to the coupling part 96.

The coupling part 96 of the clamping nut 84 has an internal thread into which the clamping screw 82 can be screwed. When the clamping screw 82 is screwed into this internal thread, then it tightens the contact part 98 of the clamping nut 84 on the contact portion 94 of the recess 90. As a result thereof, the positioning base 66 is locked to the platform 16.

In the embodiment shown in FIG. 6, the clamping nut 84 has a clearance in the plane of adjustment in the unlocked state, whereas the clamping screw 82 is seated in the insertion hole 86 in a largely clearance-free manner. However, this embodiment is only exemplarily. It is likewise possible to provide the clamping screw 82 with clearance by way of a suitable dimensioning of the insertion hole 86 and to arrange the clamping nut 84 fixedly on the positioning base 66. For adjusting purposes, it must only be guaranteed that the positioning base 66 has a clearance in the plane of adjustment in the base receptacle 70 so that the platform 16 can be displaced relative to the positioning base 66 which is spatially fixed to the positioning bar 54 in that the mating pin 74 engages with the mating hole 76 in an accurately fitting manner.

As can further be seen in FIG. 6, the fixing screw 62, too, is arranged in the through hole 64 such that there is clearance in the plane of adjustment. This clearance has to be dimensioned such that the fixing screw 62 can be screwed into the nut 60 within the entire area in which the platform 16 can be moved relative to the microscope stand 12 for adjusting purposes.

Figure 7:
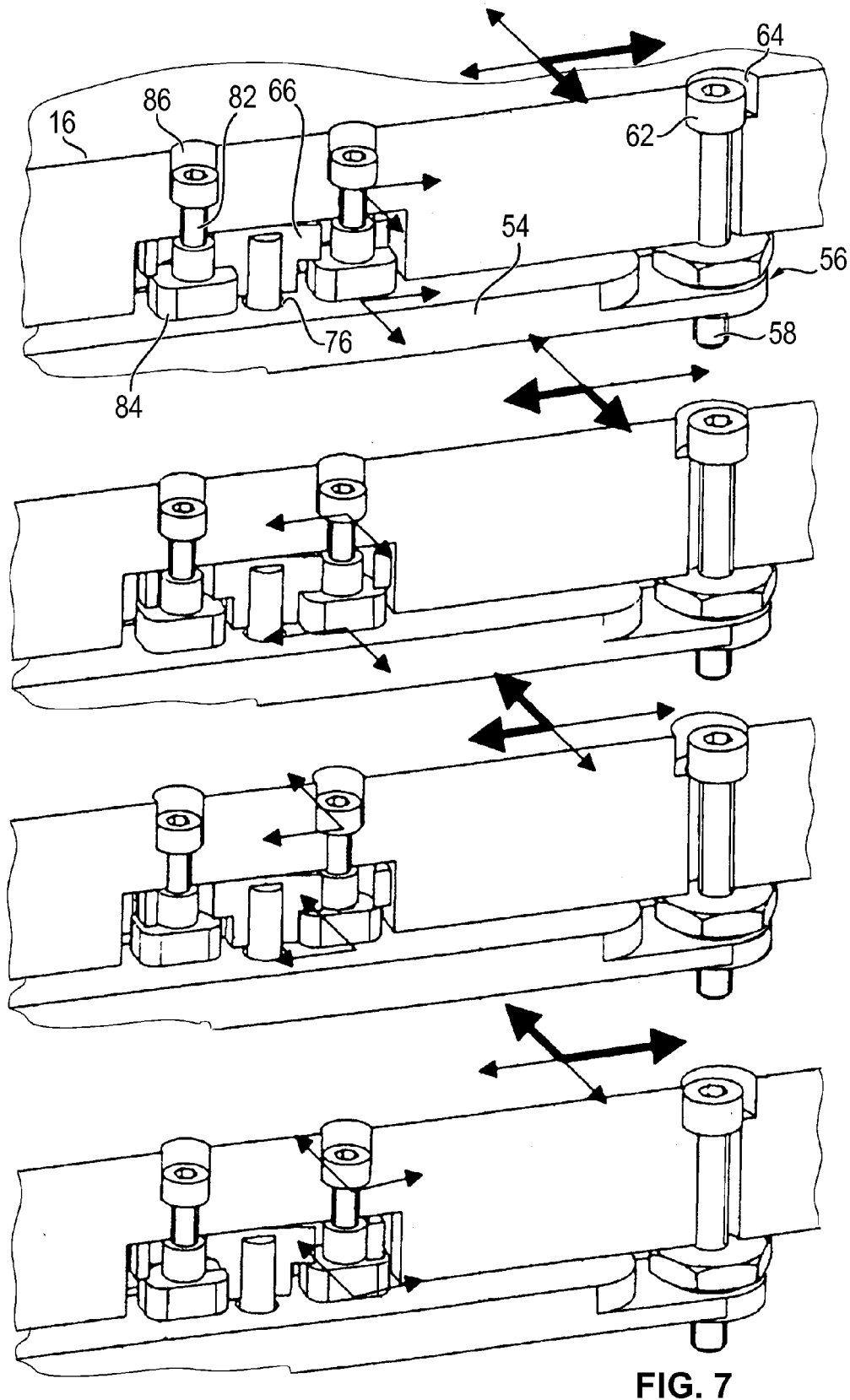
FIG. 7 shows further views corresponding to the view of FIG. 6 and showing various adjusting states.

The afore-explained relations are once again illustrated in FIG. 7 where different adjusting states are shown. Here, the arrows each indicate the displacement of the platform 16 on the positioning bar 54 and thus on the microscope stand 12. These displacements are reflected in corresponding movements of the locking clamps 80 within the base receptacle 70 relative to the positioning base 66.

For mounting the microscope stage 14 in an adjusted manner to the microscope stand 12, at first the platform 16 is placed on the positioning bars 52, 54, which are firmly mounted to the microscope stand 12, such that the mating pins 74 present on the positioning bases 66 engage with the associated mating holes 76 formed in the positioning bars 52, 54. Since the mating pins 74 and the mating holes 76 engage with one another largely free of clearance, the positioning bases 66 and the positioning bars 52, 54 (and thus the microscope stand 12) have a fixed spatial arrangement to one another. Then, the platform 16 is displaced on the positioning bars 52, 54 in the plane of adjustment until the objective 38 mounted to the platform 16 is precisely aligned to the optical axis of the microscope stand. Thereafter, the locking clamps 80 are tightened to fix the positioning bases 66 to the platform 16. As a result, the mating pins 74 are fixed relative to the platform 16. Finally, the fixing screws 62 are screwed into the screw/nut elements 56.

When the microscope stage 14 which is mounted to the microscope stand 12 in an adjusted manner is again removed later on for example for repair purposes by releasing the fixing screws 62, then it does not have to be re-adjusted when it is mounted the next time as the mating pins 74 are fixed to the platform 16 in a correctly positioned manner.

The invention is not to be limited to the specific embodiments disclosed, and modifications and other embodiments are intended to be included within the scope of the invention.

LIST OF REFERENCE NUMERALS

10 light microscope
12 microscope stand
14 microscope stage
16 platform
18 specimen holder
20 positioning device
22 first slider
24 second slider
26, 28 handwheel
30 eyepiece
32 objective revolver
34 microscope objective
36 through hole
38 objective
40 focusing drive
42 holder
48 pivoted lever
52, 54 positioning bar
56 screw/nut element
58 threaded shaft
60 nut
62 fixing screw
64 through hole
66, 68 positioning base
70, 72 base receptacle
74 mating pin
76 mating hole
80 locking clamp
82 clamping screw
84 clamping nut
86 insertion hole
90 recess
92, 94 portions
96 coupling part
98 contact part

What is claimed is:

1. A device for adjustable mounting of a microscope stage (14) to a microscope stand (12), the microscope stage (14) including an objective (38) mounted thereto and a platform (16) having an underside and an upper side, the device comprising:
   at least one first connecting element (56) arranged on the microscope stand (12);
   at least one second connecting element (62) arranged on the microscope stage (14), the at least one second connecting element (62) being connectable to the first connecting element (56) for mounting the microscope stage (14) to the microscope stand (12);
   at least one first mating part (76) arranged on the microscope stand (12);
   at least one positioning base (66) arranged on the underside of the platform (16) facing the microscope stand (12);
   a second mating part (74) supported by the at least one positioning base (66), the second mating part (74) being engageable with the at least one first mating part (76);
   wherein the at least one positioning base (66) is mounted to the platform (16) so as to be movable relative to the platform over an area in a plane of adjustment that is parallel to the platform (16) with the at least one first mating part (76) and the second mating part (74) being engaged, whereby the platform (16) is adjustable relative to the microscope stand (12); and
   at least one locking device (80) for releasably locking the positioning base (66) relative to the platform (16).

2. The device according to claim 1, wherein the platform (16) includes a base receptacle (70) formed on the underside of the platform (16) and at least one insertion hole (86) formed through the upper side of the platform leading to the base receptacle (70), wherein:
   the positioning base (66) is arranged in the base receptacle with a clearance in the plane of adjustment and includes at least one recess (90) formed therein, the at least one recess (90) being connected with the at least one insertion hole (86) over the area in which the positioning base (66) is movable in the plane of adjustment via the clearance;
   the locking device comprises a clamp (80) including a first clamping element (84) seated in the base receptacle (70) and a second clamping element (82) seated in the at least one insertion hole (86), the clamp (80) being configured to lock the positioning base (66) relative to the platform (16) by tightening the second clamping element (82) relative to the first clamping element (84); and
   the first clamping element (84) is arranged in the at least one recess (90) of the positioning base (66) with clearance in the plane of adjustment, or the second clamping element (82) is arranged in the at least one insertion hole (86) of the platform (16) with clearance in the plane of adjustment.

3. The device according to claim 2, wherein the at least one recess (90) of the positioning base (66) comprises a connecting portion (92) connected with the at least one insertion hole (86) and a contact portion (94) which faces the microscope stand (12) and is expanded relative to the connecting portion (92); and wherein the first clamping element (84) comprises:
  a coupling part (96) arranged in the connecting portion (92) of the at least one recess (90) of the positioning base (66), the coupling part (96) being coupled to the second clamping element (82); and
  a contact part (98) extending from the coupling part (96) and being expanded relative to the coupling part (96), the contact part (98) coming into contact with the contact portion (94) of the at least one recess (90) of the positioning base (66) when the first clamping element (84) and the second clamping element (82) are tightened.

4. The device according to claim 3, wherein the coupling part (96) is cylindrical and the contact part (98) is a rectangular cuboid.

5. The device according to claim 2, wherein the first clamping element (84) is a nut and the second clamping element (82) is a screw.

6. The device according to claim 1, further comprising at least one positioning bar (52, 54) mounted to the microscope stand (12), the first connecting element (56) and the first mating part (76) being arranged on the at least one positioning bar (52, 54).

7. The device according to claim 6, wherein the first connecting element comprises at least one screw/nut element (56) with which the positioning bar (52, 54) is mounted to the microscope stand (12); and wherein the second connecting element comprises a fixing screw (62) arranged to be inserted in a through-hole (64) formed in the platform (16) with a clearance in the plane of adjustment, the fixing screw (62) configured to be screwed into the screw/nut element (56).

8. The device according to claim 7, wherein the at least one first mating part (76) comprises a mating hole and the second mating part (74) comprises a mating pin.

9. A method for adjustable mounting of a microscope stage (14), to which an objective (38) is mounted, to a microscope stand (12), comprising the steps of:
  providing the microscope stand (12) with a first mating part (76);
  mounting at least one positioning base (66) supporting a second mating part (74) to the underside of a platform (16) of the microscope stage (14) facing the microscope stand (12) such that the positioning base (66) is movable in a plane of adjustment that is parallel to the platform (16);
  engaging the second mating part (74) with the first mating part (76);
  adjusting the platform (16) on the microscope stand (12);
  locking the positioning base (66) to the adjusted platform (16); and
  connecting the platform (16) with the microscope stand (12).

* * * * *